United States Patent
Bartley et al.

(10) Patent No.: US 10,715,337 B2
(45) Date of Patent: *Jul. 14, 2020

(54) SECURE CRYPTO MODULE INCLUDING CONDUCTOR ON GLASS SECURITY LAYER

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Chatfield, MN (US); Mark J. Jeanson, Rochester, MN (US); Mark O. Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 15/810,464

(22) Filed: Nov. 13, 2017

(65) Prior Publication Data

US 2020/0028695 A1 Jan. 23, 2020

Related U.S. Application Data

(63) Continuation of application No. 15/014,672, filed on Feb. 3, 2016, now Pat. No. 9,887,847.

(51) Int. Cl.
*H04L 9/32* (2006.01)
*G06F 13/42* (2006.01)
(Continued)

(52) U.S. Cl.
CPC .......... *H04L 9/3263* (2013.01); *G06F 13/409* (2013.01); *G06F 13/4068* (2013.01);
(Continued)

(58) Field of Classification Search
CPC . H04L 9/3263; H04L 9/3234; G06F 13/4068; G06F 13/409; G06F 13/4282; G09C 1/00
See application file for complete search history.

(56) References Cited

U.S. PATENT DOCUMENTS 3,198,686 A 8/1965 Caligari
3,777,048 A 12/1973 Traut
(Continued)

FOREIGN PATENT DOCUMENTS

WO WO2013162843 A1 10/2013
WO WO2014139147 A1 9/2014

OTHER PUBLICATIONS

NPL Search (InnovationQ Plus) (Year: 2020).*
(Continued)

*Primary Examiner* — John B King
*Assistant Examiner* — Richard W Cruz-Franqui
(74) *Attorney, Agent, or Firm* — ZIP Group PLLC

(57) ABSTRACT

A conductor on glass security layer may be located within a printed circuit board (PCB) of a crypto adapter card or within a daughter card upon the crypto adapter card. The conductor on glass security layer includes a glass dielectric layer that remains intact in the absence of point force loading and shatters when a point load punctures or otherwise contacts the glass dielectric layer. The conductor on glass security layer also includes a conductive security trace upon the glass dielectric layer. A physical access attempt shatters a majority of the glass dielectric layer, which in turn fractures the security trace. A monitoring circuit that monitors the resistance of the conductive security trace detects the resultant open circuit or change in security trace resistance and initiates a tamper signal that which may be received by one or more computer system devices to respond to the unauthorized attempt of physical access.

16 Claims, 8 Drawing Sheets

(51) Int. Cl.
*G06F 13/40* (2006.01)
*G09C 1/00* (2006.01)

(52) U.S. Cl.
CPC ........... *G06F 13/4282* (2013.01); *G09C 1/00* (2013.01); *H04L 9/3234* (2013.01)

(56) References Cited

U.S. PATENT DOCUMENTS

| | | | |
|---|---|---|---|
| 4,119,688 | A | 10/1978 | Hiraoka |
| 4,606,611 | A | 8/1986 | Fergason |
| 5,679,498 | A | 10/1997 | Greenwood et al. |
| 6,069,563 | A | 5/2000 | Kadner et al. |
| 6,389,533 | B1 | 5/2002 | Davis et al. |
| 6,502,032 | B1 | 12/2002 | Newman |
| 7,065,656 | B2 * | 6/2006 | Schwenck ............... G06F 21/87 |
| | | | 713/194 |
| 7,472,836 | B2 | 1/2009 | Farooq et al. |
| 7,475,474 | B2 | 1/2009 | Heitmann et al. |
| 7,703,201 | B2 | 4/2010 | Oggioni et al. |
| 7,760,086 | B2 | 7/2010 | Hunter et al. |
| 7,788,801 | B2 | 9/2010 | Oggioni et al. |
| 7,923,647 | B2 | 4/2011 | Murakami et al. |
| 7,978,070 | B2 | 7/2011 | Hunter |
| 8,399,781 | B1 | 3/2013 | Pham et al. |
| 8,522,051 | B2 | 8/2013 | Hankhofer et al. |
| 8,659,908 | B2 | 2/2014 | Adams et al. |
| 8,938,627 | B2 | 1/2015 | Oggioni et al. |
| 9,268,451 | B2 | 2/2016 | Gotoh et al. |
| 10,255,670 | B1 * | 4/2019 | Wu ....................... H04N 5/2252 |
| 2002/0002683 | A1 * | 1/2002 | Benson .................. G06F 21/86 |
| | | | 713/194 |
| 2005/0130400 | A1 | 6/2005 | Grupp et al. |
| 2009/0008136 | A1 * | 1/2009 | Ikeguchi ............. H01L 23/5383 |
| | | | 174/255 |
| 2010/0040874 | A1 | 2/2010 | Narahashi et al. |
| 2011/0012842 | A1 * | 1/2011 | Lee ........................ C03C 17/36 |
| | | | 345/173 |
| 2011/0232725 | A1 * | 9/2011 | Wan .................. H01L 31/02008 |
| | | | 136/251 |
| 2013/0050228 | A1 | 2/2013 | Petersen et al. |
| 2013/0081869 | A1 | 4/2013 | Kim et al. |
| 2013/0136280 | A1 * | 5/2013 | Stephanou ............. H04R 17/00 |
| | | | 381/190 |
| 2013/0224990 | A1 * | 8/2013 | Reul ..................... H01R 13/56 |
| | | | 439/495 |
| 2013/0229365 | A1 | 9/2013 | Lin et al. |
| 2014/0043284 | A1 | 2/2014 | Park et al. |
| 2014/0186615 | A1 | 7/2014 | An et al. |
| 2014/0242362 | A1 | 8/2014 | Nakako et al. |
| 2014/0325688 | A1 | 10/2014 | Cashin et al. |
| 2014/0357147 | A1 | 12/2014 | Min et al. |
| 2015/0027757 | A1 | 1/2015 | Shin et al. |
| 2015/0319852 | A1 | 11/2015 | Min et al. |
| 2017/0222816 | A1 * | 8/2017 | Bartley ............... G06F 13/4068 |

OTHER PUBLICATIONS

Printed circuit board Wikipedia—https://en.wikipedia.org/wiki/Through-hole_technology, dated herewith.

List of IBM Patents or Patent Applications Treated As Related, dated herewith.

* cited by examiner

SECURE CRYPTO MODULE INCLUDING CONDUCTOR ON GLASS SECURITY LAYER

FIELD OF THE INVENTION

Embodiments of the invention generally relate to computer systems and more particularly to computer systems that have a secure crypto module including a conductor on glass security layer.

DESCRIPTION OF THE RELATED ART

A cryptograph module is a set of hardware, software, firmware, or some combination thereof that implements cryptographic logic or cryptographic processes, including cryptographic algorithms, and is contained within the cryptographic boundary of the module. U.S. Government Federal Information Processing Standard (FIPS) 140-2 Security Requirements for Cryptographic Modules—(Level 4) is a standard that specifies security requirements for cryptographic modules. This standard requires that physical security mechanisms provide a complete envelope of protection around the cryptographic module with the intent of detecting and responding to all unauthorized attempts at physical access.

A non-exhaustive list of a cryptographic modules is as follows: cryptographic coprocessor, cryptographic accelerator, cryptographic adapter card, cryptographic field programmable gate array (FPGA), memory storing cryptographic accelerator data, etc.

In a particular example of a cryptographic module: a cryptographic coprocessor is a secure cryptoprocessor that performs cryptographic operations used by application programs and by data handling operations, such as SSL (Secure Sockets Layer) private key transactions associated with SSL digital certificates. The cryptoprocessor includes a tamper-responding hardware security module that provides secure storage for storing crypto keys and other sensitive data. Cryptoprocessor applications may include financial PIN (Personal Identification Number) transactions, bank-to-clearing-house transactions, EMV (Europay®, MasterCard®, and Visa®) transactions for integrated circuit (chip) based credit cards, basic SET (Secure Electronic Transaction) block processing, and general-purpose cryptographic applications using symmetric key, hashing, and public key algorithms. The crypto keys may be generated in the cryptoprocessor and may be saved in a keystore file encrypted under a master key of that cryptoprocessor.

In another particular example of a cryptographic module: a cryptographic adapter card includes a printed circuit board that may be plugged into a computer system motherboard. The cryptographic adapter card includes a secure crypto module that contains and generally forms a crypto boundary to one or more other cryptographic modules contained therein forming the envelope of protection around the one or more other cryptographic module(s). Secure crypto modules typically include tamper sensors that detect and respond to unauthorized attempts at physical access.

SUMMARY

In an embodiment of the present invention, an adapter card is claimed. The Adapter card includes a printed circuit board (PCB), a secure crypto module, and a resistance monitor device. The PCB includes a connector that interconnects with a motherboard. The PCB includes a PCB conductor on glass security layer comprising a first security trace directly upon a first toughened glass substrate. The secure crypto module includes a daughter card electrically connected to the PCB, a shield comprising a metal shell that surrounds the daughter card, and a shield conductor on glass security layer directly upon an inner surface of the metal shell that faces the daughter card. The shield conductor on glass security layer includes a second security trace directly upon a second toughened glass substrate. The daughter card includes one or more wiring layers each including a signal trace directly upon a dielectric layer, a crypto component, and a daughter card conductor on glass security layer comprising a third security trace directly upon a third toughened glass substrate. The resistance monitor device is electrically connected to the first security trace, the second security trace, and the third security trace. A destruct feature of the crypto component is programmed in response to the resistance monitor device detecting the resistance across the first security trace, the second security trace, or the third security trace exceeds a respective predetermined threshold.

In another embodiment of the present invention, a data handling electronic device is claimed. The data handling device includes a motherboard, a printed circuit board (PCB), a secure crypto module, and a resistance monitor device. The PCB includes a connector that interconnects with a motherboard. The PCB includes a PCB conductor on glass security layer comprising a first security trace directly upon a first toughened glass substrate. The secure crypto module includes a daughter card electrically connected to the PCB, a shield comprising a metal shell that surrounds the daughter card, and a shield conductor on glass security layer directly upon an inner surface of the metal shell that faces the daughter card. The shield conductor on glass security layer includes a second security trace directly upon a second toughened glass substrate. The daughter card includes one or more wiring layers each including a signal trace directly upon a dielectric layer, a crypto component, and a daughter card conductor on glass security layer comprising a third security trace directly upon a third toughened glass substrate. The resistance monitor device is electrically connected to the first security trace, the second security trace, and the third security trace. A destruct feature of the crypto component is programmed in response to the resistance monitor device detecting the resistance across the first security trace, the second security trace, or the third security trace exceeds a respective predetermined threshold.

These and other embodiments, features, aspects, and advantages will become better understood with reference to the following description, appended claims, and accompanying drawings.

DETAILED DESCRIPTION

A conductor on glass security layer is utilized by a cryptographic adapter card that includes one or more secured circuit devices. The conductor on glass security layer may be located within a PCB of a crypto adapter card or within a secure crypto module upon the crypto adapter card. The crypto adapter card may be installed within a computer system that performs cryptographic functions. The conductor on glass security layer includes a glass dielectric layer. The glass dielectric layer remains intact in the absence of point force loading and shatters when a point load punctures or otherwise contacts the glass dielectric layer. For example, at least the majority of the glass dielectric layer shatters when a point load intrudes into the glass dielectric layer by 0.004 inches or a hole of 0.004 inches in diameter intrudes into the glass dielectric layer. For clarity, the detection of a 0.004 inch tamper event is used for convenience and tamper detection of smaller or larger dimensional point loads with the conductor on glass security layer are contemplated.

A conductive security trace is formed upon the top and/or bottom surfaces of the glass dielectric layer. The conductive security trace may be formed upon the glass dielectric layer surfaces in a serpentine shape.

A physical access attempt, such as a drill, or other point load, shatters a majority of the overall glass dielectric layer, which in turn fractures the conductive security trace. A monitoring circuit that monitors the resistance of the conductive security trace detects the resultant open circuit or change in conductive security trace resistance and initiates a tamper signal that which may be received by one or more computer system devices to respond to the unauthorized attempt of physical access. For example, one or more cryptographic adapter card or computer system functions may be disabled.

Figure 1:
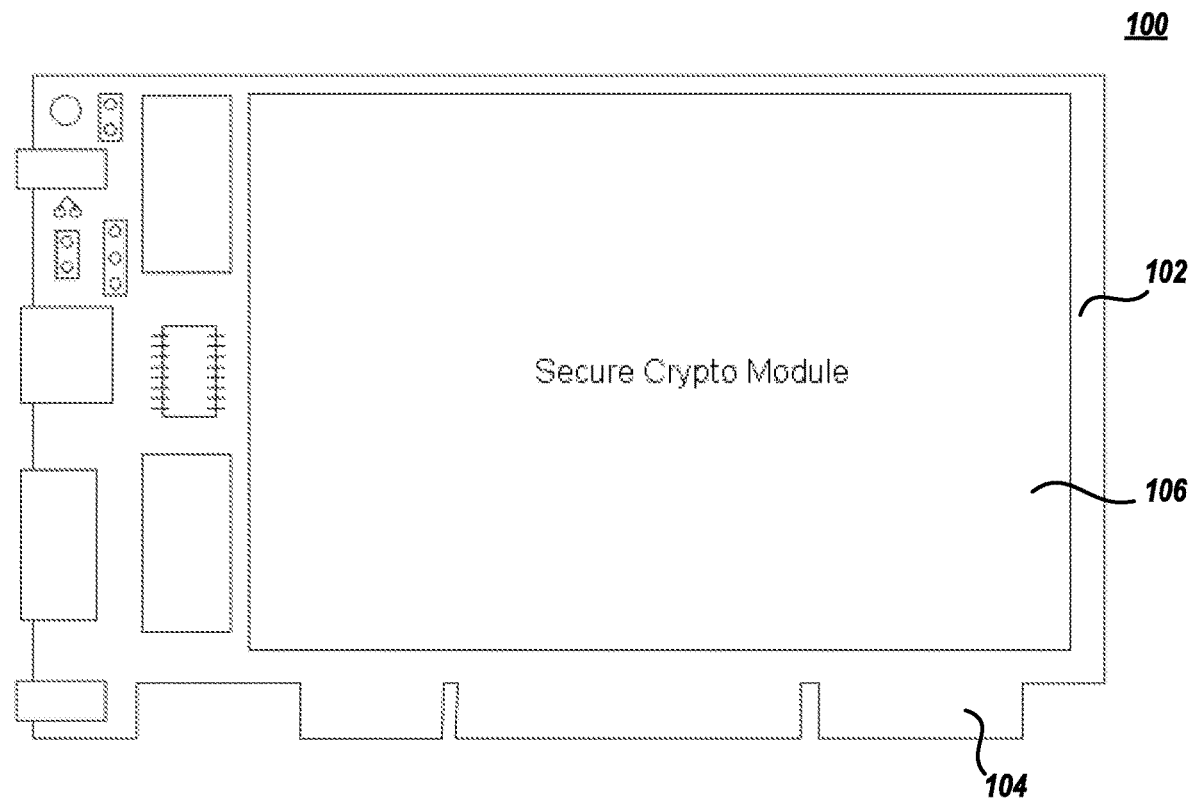
FIG. 1 illustrates an exemplary crypto adapter card including a secure crypto module that utilizes various embodiments of the present invention.

Referring to the Drawings, wherein like numbers denote like parts throughout the several views, FIG. 1 illustrates a crypto adapter card 100 that includes a secure crypto module 106. Crypto adapter card 100 includes a printed circuit board (PCB) 102 and connector 104 that can be inserted into an electrical connector, or expansion slot on a computer motherboard, backplane or riser to add functionality to the computer via an expansion bus. PCB 102 provides mechanical support for various electronic components as well as conductive pathways to provide for electrical communication (e.g., data transfer, etc.) there between and to and from the motherboard. The computer motherboard, backplane or riser, hereinafter referred to as a motherboard, provides mechanical support for computer components such as a processor and memory and provides conductive pathways to provide for electrical communication to and from the computer components. The expansion bus, a particular conductive pathway, is a computer bus which moves information between the internal hardware of the computer (e.g., the processor and memory) and peripheral devices.

Secure crypto module 106 provides a complete envelope of protection around a cryptographic PCB module 110 (not shown in FIG. 1) to detect and respond to unauthorized attempts at physical access or tampering therewith.

Figure 2:
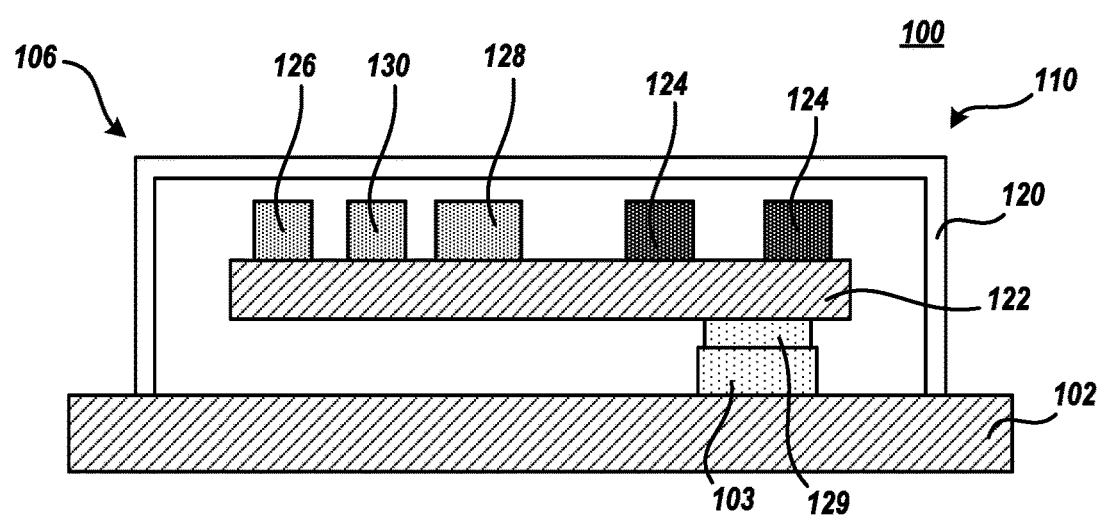
FIG. 2 illustrates an exemplary cross section of an exemplary crypto adapter card that includes a cryptographic printed circuit board (PCB) module, according to various embodiments of the present invention.

FIG. 2 illustrates a cross section of crypto adapter card 100. Secure crypto module 106 includes cryptographic PBC module 110 and shield 120. Cryptographic module 110 is a collective set of hardware that physically resides upon daughter PCB 122 or is software, firmware, etc. called by that hardware that resides upon daughter PCB 122 that which implements cryptographic logic or cryptographic processes, including cryptographic algorithms, and is contained within the boundary or shield 120 of the secure crypto module 106.

As is further described herein, PCB 102 and/or daughter PCB 122 includes a conductor on glass security layer that detects unauthorized physical access attempts thereupon. The conductor on glass security layer may be located in various locations within the PCB layer buildup. For example, the conductor on glass security layer may be located in the PCB layers nearest the PCB upper surface or lower surface, or may alternatively be located in an inner PCB layer. In another embodiment, a security on glass layer may be alternatively located or additionally located upon one or more inner surfaces of shield 120. Damage to the glass dielectric layer may cause zeroization of area(s) of the one or more crypto components 124 where sensitive data is stored, disabling of the one or more crypto components 124, etc.

Cryptographic module 110 includes a daughter PCB 122 and one or more crypto devices 124. Cryptographic module 110 may further include battery 126, enable device 128, connector 103, connector 129, and monitor device 130. Daughter PCB 122 provides mechanical support for crypto devices 124 and for battery 126, enable device 128, and monitor device 130 when included within cryptographic module 110. Daughter PCB 122 includes electrical traces therein that connect more crypto devices 124 to other electrical devices upon the daughter PCB 122, upon PCB 102, and/or upon the computer system motherboard, etc. Connector 129 generally electrically connects the daughter PCB 122 to PCB 102 via PCB connector 103.

The various connectors and conductive pathways contemplated herein generally allow for crypto devices 124 to electrically communicate with one or more computer components of the motherboard. When crypto adapter card is not connected to the motherboard (where electrical potential is provided therefrom), battery 126 provides electric potential to enable device 128 to program or enable a destruct feature within each crypto device 124. The battery 126 may further provide backup power to one or more features of the cryptographic module 110 and may be active from the time of factory initialization until the end of the cryptographic module 110 expected product life.

Crypto devices 124 are hardware computer components that implement cryptographic logic or cryptographic processes or otherwise store or handle cryptographic data. A non-exhaustive list of crypto devices 124 are a coprocessor, memory (DRAM, Flash, ROM, RAM, etc.), FPGA, etc.

Shield 120 is an enclosure, chassis, envelope, or other shell that generally surrounds and protects the internal cryptographic module 110. Shield 120 may be void of access or air flow cutouts to limit access the internal cryptographic module 110. In some implementations where a crypto component 124 may be cooled, a heat sink may be thermally attached to the crypto component 124 and the fins or pins of the heat sink may protrude through the shield 120. In an embodiment, shield 120 may surround the cryptographic module 110 on at least five sides, the sixth side of cryptographic module 110 being protected by the printed circuit board 102. In another embodiment, shield 120 may surround the cryptographic module 110 on all six sides of the cryptographic module 110 with the sixth side including a cutout to allow the daughter PCB 122 to be electrically connected to PCB 102 via connects 129, 103.

In embodiments, the shield 120 may be formed from sheet metal. By surrounding the internal cryptographic module 110, shield 120 generally protects the cryptographic module 110 by limiting physical penetration thereto. In an embodiment, shield 120 may also incorporate the conductor on glass security layer upon one or more inner surfaces that generally face cryptographic module 110.

Though shown in FIG. 2 generally as surface mount components, circuits, etc. upon daughter PCB 122, crypto component 124, battery 126, enable device 128, monitor device 130 may alternatively be imbedded within daughter PCB 122. For example, monitor device 130 may be a bridge circuit imbedded within daughter PCB 122. Similarly, one or more of the crypto component 124, battery 126, enable device 128, monitor device 130, etc. shown in association with daughter PCB 122 may be physically located upon or imbedded within PCB 102.

Figure 3:
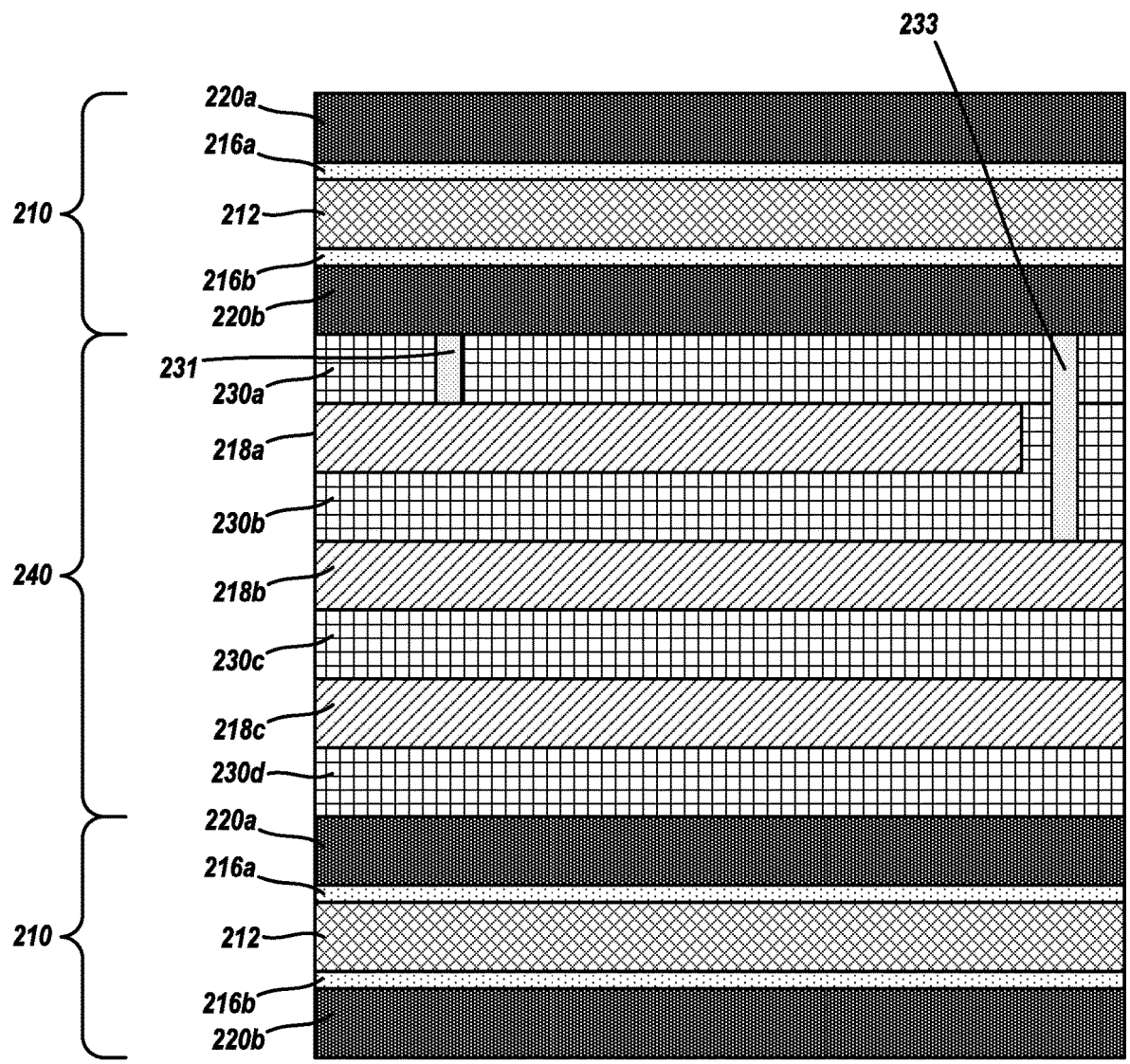
FIG. 3-FIG. 6 illustrates exemplary cross section views of an crypto adapter card PCB or a daughter PCB of the cryptographic PCB module, according to various embodiments of the present invention.

FIG. 3 illustrates an exemplary cross section view of adapter card PCB 102 or daughter PCB 122 including a security conductor on glass layer 210, according to various embodiments of the present invention. In a particular implementation of the crypto adapter card 100, only the PCB 102 and not daughter PCB 122 includes security conductor on glass layer 210. In another implementation of the crypto adapter card 100, only the daughter PCB 122 and not PCB 102 includes security conductor on glass layer 210. In yet another implementation of the crypto adapter card 100, both the PCB 102 and daughter PCB 122 include a respective security conductor on glass layer 210.

The glass dielectric 212 is generally a tempered, or toughened, glass layer that remains intact in the absence of point force loading and fractures when a point load punctures or otherwise contacts the glass dielectric layer. For example, at least the majority of the glass dielectric layer 212 fractures when a point load intrudes into the glass dielectric layer 212 by 0.004 inches or a hole of 0.004 inches in diameter intrudes into the glass dielectric layer 212.

In an embodiment, a single security conductor on glass layer 210 or multiple instances of security conductor on glass layer 210 surround all sides of crypto component 124, battery 126, enable device 128, monitor device 130, etc. For example, security conductor on glass layer 210 may be located upon the top, bottom, front, rear, and side surfaces of daughter PCB 122 and may fully encapsulate the crypto component 124, battery 126, enable device 128, monitor device 130 imbedded within daughter PCB 122.

In the exemplary cross section depicted in FIG. 3, at least one security conductor on glass layer 210 is located on the outer or perimeter of PCB 102, daughter PCB 122. In other words, security conductor on glass layer 210 is formed upon wiring stack 240. As such, a security conductor on glass layer 210 may be formed upon a top surface of wiring stack 240 and/or a security conductor on glass layer 210 may be formed upon a bottom surface of wiring stack 240. In a particular fabrication, the security conductor on glass layer 210 may be laminated to wiring stack 240. Security conductor on glass layer 210 may be laminated to the wiring stack 240 by known epoxy systems used in existing PCB manufacturing. Since glass dielectric layer 212 is at least partially comprised of the same glass fibers used in conventional PCB laminates, conventional epoxy resins are compatible with glass dielectric layer 212. Alternatively, polyimide-based adhesive bonding films could be used to adhere security conductor on glass layer 210 with wiring stack 240.

Wiring stack 240 includes one or more conductive trace layers 218 interleaved with one or more dielectric layers 230. Trace layer 218 may be a copper sheet that is laminated to dielectric layer 230 and patterned to form an electrically conductive trace. The trace layer 218 is patterned to form multiple traces as is known in the art. The traces serve as the electrical pathway to provide for electrical communication between electrical components or devices. One or more traces upon a particular wiring layer may be electrically connected to one or more traces upon another wiring layer by plated-through holes called vias. Dielectric layer 230 may be a FR-4 glass epoxy layer. As is known in the art, FR-4 is the primary insulating substrate upon which the vast majority of rigid PCBs are produced. Complex circuit boards may be produced when wiring stack 240 includes multiple layers. For clarity, in the cross section of FIG. 3, a trace is shown at each trace layer 218 and in another cross section, the trace may be absent.

In a particular fabrication, the PCB 102 and/or daughter PCB 122 includes a first dielectric layer 230a and a first trace layer 218a laminated thereto. The first trace layer 218a is patterned to form multiple traces as is known in the art. A second dielectric layer 230b and a second trace layer 218b laminated thereto is laminated the underside of first trace layer 218a. The second trace layer 218b is patterned and vias that connect traces of the second trace layer 218b with the first trace layer 218a are formed, as is known in the art. A third dielectric layer 230c and a third trace layer 218b laminated thereto is laminated the underside of the second trace layer 218b. The third trace layer 218c is patterned and vias that connect traces of the third trace layer 218c with the second trace layer 218b are formed. Finally, a fourth dielectric layer 230d is laminated the underside of the third trace layer 218c. Though a particular number of wiring layers are shown in wiring stack 240, a fewer number or greater number of wiring layers may exist.

In some embodiments, a plated through hole via 231 may electrically connect trace layer 218a (or a signal trace formed therefrom) to security trace layer 220b (or to security trace formed therefrom). In this way, a particular signal trace within the PCB 122 or PCB 102 may be electrically connected to the security trace. In some embodiments, another plated through hole via 233 may electrically connect trace layer 218b (or a signal trace formed therefrom) to security trace layer 220b (or to security trace formed therefrom). In this way, a different particular signal trace within the PCB 122 or PCB 102 may be electrically connected to the security trace. As such two particular signal traces within the PCB 122 or PCB 102 may be electrically connected to the security trace. These two particular signal traces may be electrically connected to a resistance monitor device such that the monitor device may measure the resistance across the security trace.

In a particular fabrication, the PCB 102 and/or daughter PCB 122 includes a two sided conductor on glass security layer 210. The two sided conductor on glass security layer 210 includes glass dielectric layer 212. A first bonding layer 216a bonds a first security trace layer 220a to an upper side of glass dielectric layer 212. Likewise, a second bonding layer 216b bonds a second security trace layer 220b to a lower side of glass dielectric layer 212. The first security trace layer 220a and second security trace layer 220b are patterned by techniques known in the art to form a security trace generally denoted as 220'. The upper security trace 220' may be electrically connected to the lower security trace 220' by a wire or the like. A first instance of the two sided conductor on glass security layer 210 may be laminated to the top surface of the first dielectric layer 230a. Likewise, a second instance of the two sided conductor on glass security layer 210 may be laminated to the bottom surface of the fourth dielectric layer 230d.

A security trace layer 220 is generally a sheet of electrically conductive material that which a security trace 200' is formed therefrom that will itself fracture when the underlying glass dielectric layer 212 shatters as a result of tampering. For example, a security trace layer 220 may be an Indium Tin Oxide layer, Molybednium/aluminum/moly (MAM) layer, or the like.

The layer 220 may be applied to glass dielectric by known techniques such as deposition, sputtering, lamination, etc. For example, an Indium Tin Oxide layer may be applied to glass substrate 212 to form layer 220, a MAM layer may be sputtered onto glass substrate 212, etc. Once the layer 220 is formed it may be etched to form security traces 220', which may be a sub-50 micron (<2 mils) conductive trace. For clarity, depending upon the fabrication technique utilized, the bonding layer 216 may or may not be needed to connect or otherwise bond glass dielectric layer 212 with security trace layer 220.

The term fracture, or the like, utilized herein means that the security trace is severed (i.e. completely separated) at the shatter location of the adjacent glass dielectric or the security trace cross-sectional area is reduced at the shatter location of the adjacent glass dielectric 212.

Figure 4:
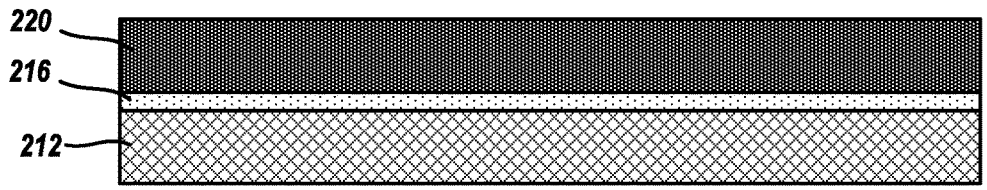

FIG. 4 illustrates an exemplary cross section view of a security conductor on glass layer 210, according to various embodiments of the present invention. In the exemplary cross section depicted in FIG. 4, a single conductor on glass security layer 210 includes a glass dielectric layer 212 and a bonding layer 216 that bonds a security trace layer 220 to an upper side of glass dielectric layer 212. The bottom surface of glass dielectric layer 212 may be bonded to another surface, such as shell 120, wiring stack 240, etc.

Figure 5:
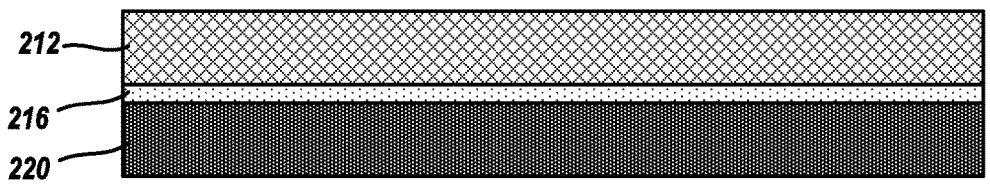

FIG. 5 illustrates an exemplary cross section view of a security conductor on glass layer 210, according to various embodiments of the present invention. In the exemplary cross section depicted in FIG. 5, a single conductor on glass security layer 210 includes a glass dielectric layer 212 and a bonding layer 216 that bonds a security trace layer 220 to a lower side of glass dielectric layer 212. The upper surface of glass dielectric layer 212 may be bonded to another surface, such as shell 120, wiring stack 240, etc.

Figure 6:
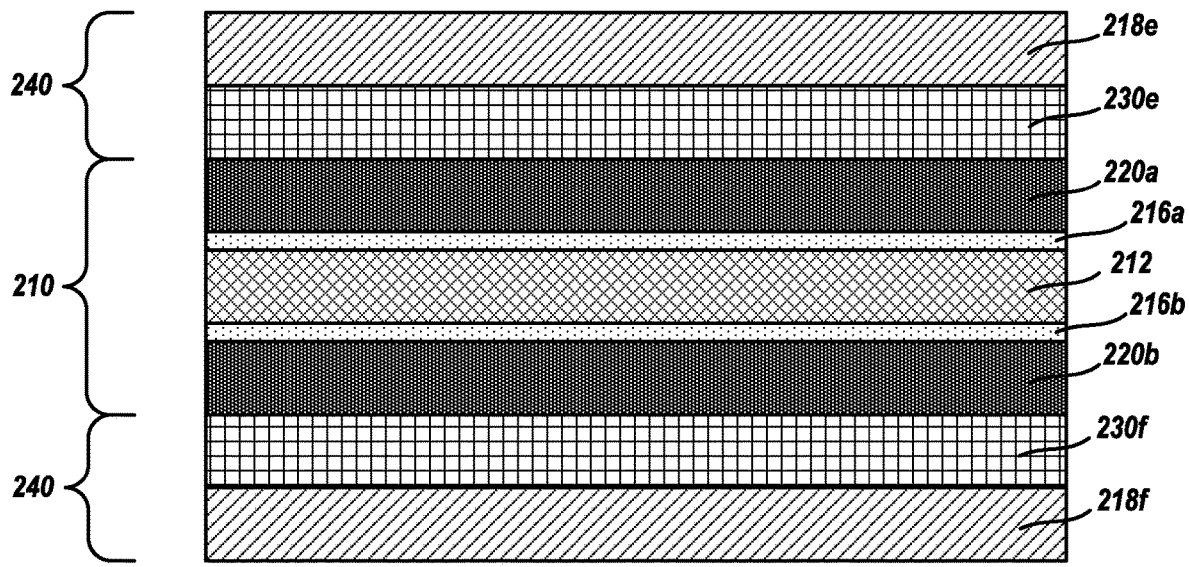

FIG. 6 illustrates an exemplary cross section view of adapter card PCB 102 or daughter PCB 122 including an internal security conductor on glass layer 210, according to various embodiments of the present invention. In the exemplary cross section depicted in FIG. 6, at least one security conductor on glass layer 210 is located internal to PCB 102, daughter PCB 122. In other words, security conductor on glass layer 210 is between two instances of wiring stack 240. For example, the PCB 102 and/or daughter PCB 122 includes a first dielectric layer 230e and a first trace layer 218e laminated thereto. The first trace layer 218e is patterned to form multiple traces as is known in the art. In the fabrication, the PCB 102 and/or daughter PCB 122 includes a second dielectric layer 230f and a second trace layer 218f laminated thereto. The second trace layer 218f is patterned to form multiple traces as is known in the art. Also in the fabrication, the PCB 102 and/or daughter PCB 122 includes a two sided conductor on glass security layer 210. An upper side of the glass dielectric layer 220a may be laminated to a bottom surface of dielectric layer 230e. Similarly, a lower side of the glass dielectric layer 220b may be laminated to an upper surface of dielectric layer 230f.

Figure 7:
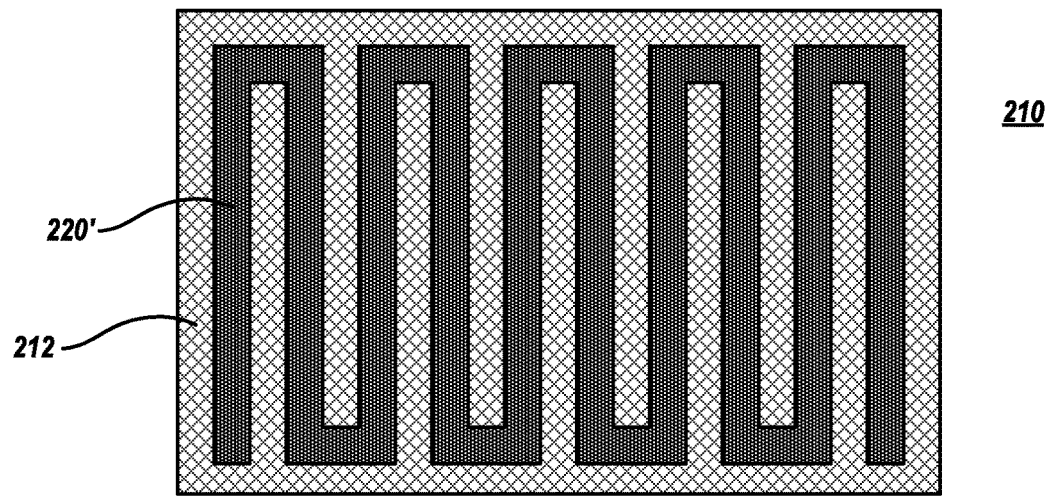
FIG. 7 illustrates an exemplary view of a patterned conductor on glass layer, according to various embodiments of the present invention.

FIG. 7 illustrates an exemplary view of a patterned a security conductor on glass layer 210, according to various embodiments of the present invention. In an embodiment the conductor on glass layer 210 may be patterned by patterning a security trace layer 220. The security trace layer 220 may be patterned by a subtractive etching process. In such process, a photosensitive mask is applied to the to-be patterned security trace layer 220. Portions of the photosensitive mask are exposed to light thereby forming a pattern upon and within the photosensitive mask. Material of the photosensitive mask is removed thereby exposing the underlying portions of security trace layer 220. The material of the photosensitive mask that remains upon the security trace layer 220 generally forms a mask that protects the underlying portions of security trace layer 220 from an etchant or other chemical that removes the material of security trace layer 220 from the surface of the glass dielectric 212. The mask may then be removed and the masked portions of the security trace layer 220 generally remain intact, thereby forming patterned security trace layer 220' upon glass dielectric 212.

The mask may be a known mask material such as a photoresist that may be patterned formed upon the security trace layer 220. The mask may be applied as a liquid that may dry and be patterned. For example, a liquid photoresist may be formed by precision spraying, roller coating, dip coating, spin coating, etc. Exemplary liquid photoresists can be either positive tone resists such as TCIR-ZR8800 PB manufactured by Tokyo Ohka Kogyo America, Inc. or negative tone resists such as JSR THB 126N manufactured by JSR Micro, Inc., Poly(methyl methacrylate) (PMMA), Poly(methyl glutarimide) (PMGI), Phenol formaldehyde resin (DNQ/Novolac), etc. The mask may also be a semi-solid film coated, laminated, or otherwise formed upon the security trace layer 220. For example, the mask may be a dry photoresist such as Asahi CX8040, Asahi CXA240, Riston photoresists, WBR photoresists.

In a particular fabrication, as is shown in FIG. 7, the patterned security trace 220' may be serpentine shaped. Generally, the patterned security trace 220' is a continuous shape that traverses the majority of the surface length and surface width of the adjacent glass dielectric 212.

As is shown in FIG. 3-FIG. 7, the security conductor on glass layer 210 include a patterned security trace 220' upon the glass dielectric 212 may be formed by subtractive fabrication techniques where excess conductive layer 220 material is generally removed to form the patterned security trace 220'.

In another embodiment, the security trace 220' may be directly or positively applied to the top and/or bottom sides of the glass dielectric 212. For example, the security trace 220' may be formed by printing a pattern of electrically conductive ink, printing a pattern of silver conductive ink, printing a pattern of silver conductive ink with copper or aluminum sputtering upon the pattern, coating a pattern of stannous chloride upon the top and/or bottom sides of glass dielectric 212. In similar implementation, the security trace 220' may be directly or positively applied by electroplating, depositing, or the like, conductive material that fractures upon top and/or bottom sides of glass dielectric 212.

Figure 8:
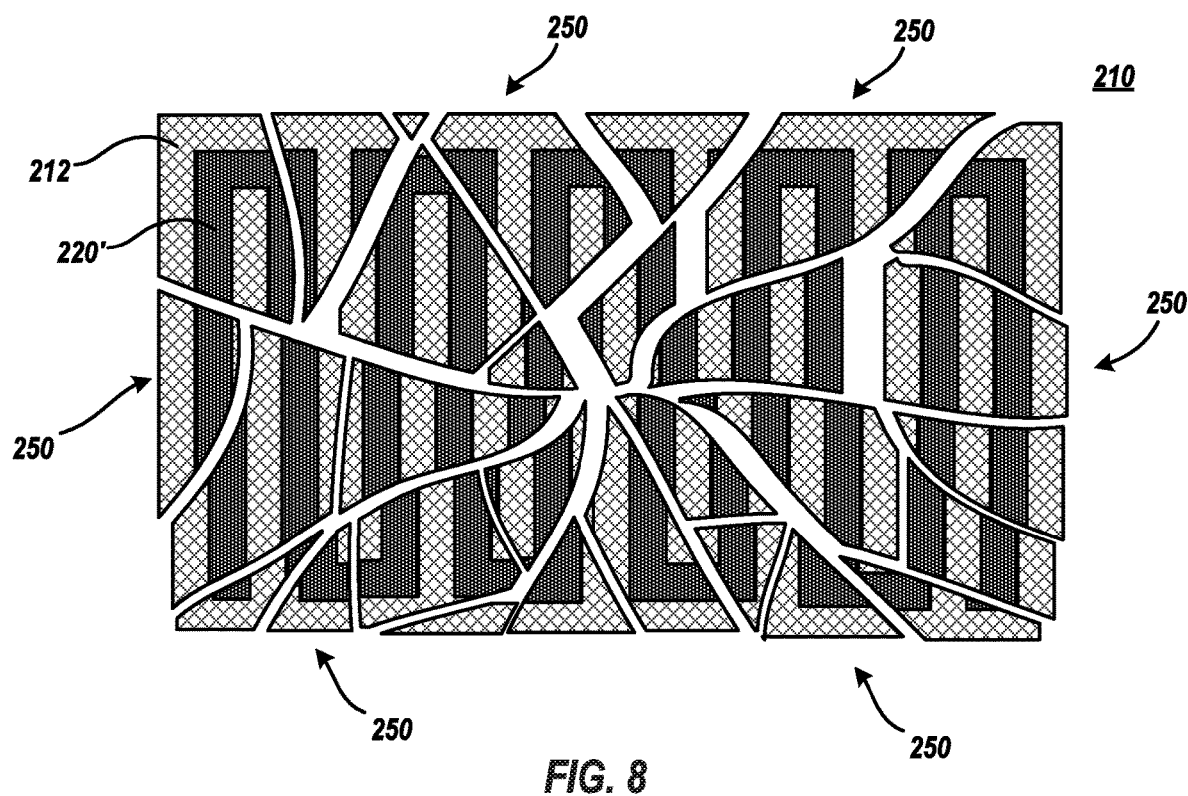
FIG. 8 illustrates an exemplary post tamper event view of a fractured conductor on shattered glass of the cryptographic PCB module, according to various embodiments of the present invention.

FIG. 8 illustrates an exemplary post tamper event view of a fractured security trace 220' and associated shattered glass substrate 212, according to various embodiments of the present invention.

Glass substrate 212 is tempered glass, or also known in the art as toughened glass. As such, glass substrate 212 outer surfaces are in compression and glass substrate 212 inner portions between the outer surfaces are in compression are in tension. Such stresses cause the glass substrate 212, when broken, to shatter or break into thumbnail sized sections 250. The greater the surface stress, the smaller the glass particles will be when broken. Because of the stresses in the glass substrate 212, damage to any portion will eventually result in the majority area of glass substrate 212 shattering into thumbnail-sized (or smaller) sections 250. For example, at least the majority of the glass substrate 212 area shatters into sections 250 when a point load intrudes into the glass substrate 212 by 0.004 inches or when a hole of 0.004 inches in diameter intrudes into the glass substrate 212. The unauthorized physical access attempt, from a drill, or other point load, shatters glass substrate 212 and fractures the adjacent conductive security trace 220'.

The exemplary depiction of fractured security trace 220' and associated shattered glass substrate 212 shown in FIG. 8 depicts completely severed sections 250 and associated severed conductive security trace 220'. This means that the security trace 220' is completely separated in numerous location across the length of security trace 220'. Such severing of the security trace 220' results in security trace 220' open circuit or infinite resistance.

In other instances, the shattered glass substrate 212 sections 250 may be in direct adjacent physical contact (i.e. sections 250 tough but are not separated). In these instances, the shattering of the substrate 212 pinches or otherwise deforms the security trace 220' causing a reduction in cross-sectional area of the security trace 220'. In other words, at each section 250 junction, the cross-sectional area of the above/below security trace 220' is reduced, relative to its cross-sectional area prior to glass substrate 212 shattering. Thus, the security trace 220' is pinched or deformed in numerous locations across the length of security trace 220'. Such deformations ultimately increase the resistance of the security trace 220'.

One or more security traces 220' included within adapter PCB 102 and/or daughter PCB 122 are in electrical communication with one or more monitor devices 130, such as a bridge circuit, that monitors the resistance across one or more security traces 220'. If the security trace 220' is included in daughter PCB 122, the trace 220' may be electrically connected to monitor device 130 by known surface mount electrical interconnect techniques. If the security trace 220' is included in PCB 102, the trace 220' may be electrically connected to monitor device 130 by an interconnected conductive trace of the PCB 102, connectors 103, 129, and a conductive trace of the daughter PCB 122.

When monitor device 130 is a bridge circuit it may be e.g., Wheatstone bridge, Carey Foster bridge, etc. The Wheatstone bridge circuit may measure the resistance across security traces 220' by balancing four bridges of the circuit, wherein at least one of the bridges is the security trace 220'. In another implementations, more than one bridge of the bridge circuit are rendered by the security trace 220'.

The monitor device 130 generates an enable signal when it detects the security traces 220' being monitor have been fractured. For example, the monitor device 130 detects an open circuit if security trace 220' is an open circuit or detects the increase in resistance if the security trace 220' is deformed and sends an enable signal to enable device 128. Upon receipt of the enable signal from the monitor device, enable device 128 programs a destruct feature within crypto components 124. The programming of the destruct feature causes zeroization of area(s) of the one or more crypto components 124 where sensitive data is stored, disables the crypto component 124, etc. Further, a sense circuit may be included within the motherboard that generally determines whether the destruct feature within the crypto component 124 has been programmed and may further cause the destruction of one or more motherboard components.

Figure 9:
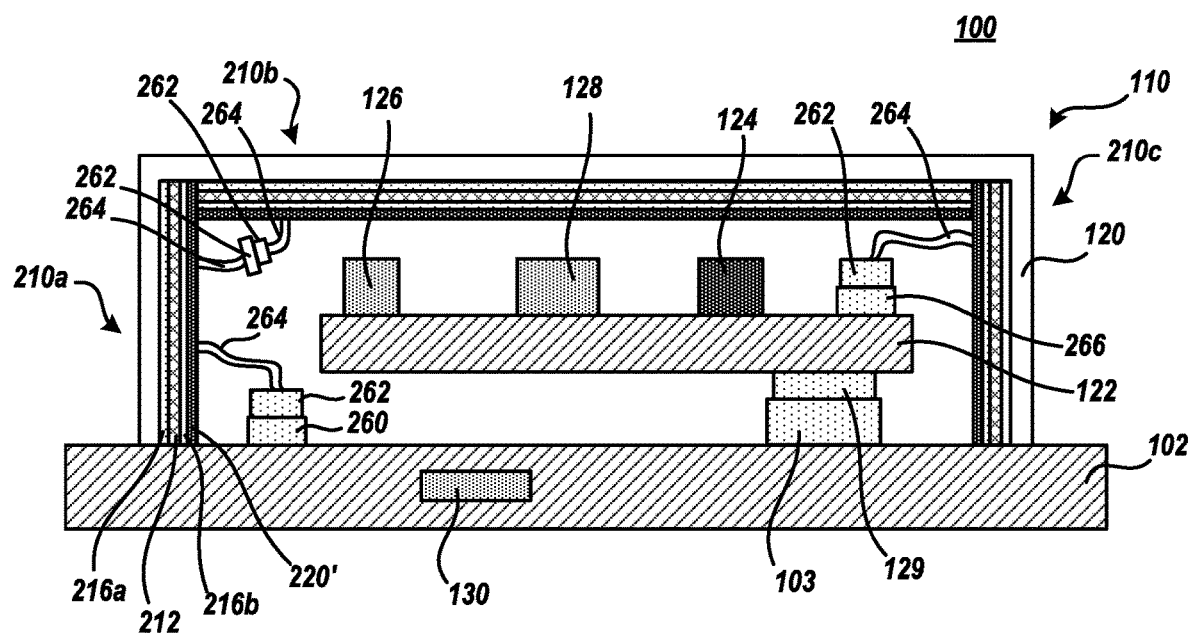
FIG. 9 illustrates an exemplary cross section of an exemplary crypto adapter card that includes a cryptographic printed circuit board (PCB) module, according to various embodiments of the present invention.

FIG. 9 illustrates an exemplary cross section of an exemplary crypto adapter card that includes cryptographic PCB module 110, according to various embodiments of the present invention. In the embodiment depicted, the conductor on glass security layer 210 is included on one or more inner surfaces of shield 120 that generally face cryptographic PCB module 110. Also depicted is an embodiment where monitor device 130 is imbedded within PCB 102.

For example, a conductor on glass security layer 210a may be included upon an inner left surface of shield 120 and may extend from the adapter PCB 102 to the inner lower surface of shield 120. The conductor on glass security layer 210a may include a glass substrate 212 upon which a security trace 220' is attached. The security trace 220' may be positively applied to the glass substrate 212 or may be attached to the glass substrate 212 via a bundling layer 216b and subsequently patterned. The distal surface of glass substrate 212 may be attached to the inner left surface of shield 120 by bonding layer 216a. The security trace 220' of 210a may be electrically connected to monitor device 130 by a wire 264 and connector 262 extending from the glass security layer 210a connected with adapter PCB connector 260 and via the electrical path from the adapter card PCB 102 through the daughter PCB 122 via the connectors 103, 129 to the monitor device 130.

In another example, a conductor on glass security layer 210c may be included upon an inner right surface of shield 120 and may extend from the adapter PCB 102 to the inner lower surface of shield 120. The security trace 220' of 210c may be electrically connected to monitor device 130 by a wire 264 and connector 262 extending from the glass security layer 210c connected with daughter PCB connector 262 and via the electrical path through the daughter PCB 122 to the monitor device 130.

In yet another example, a conductor on glass security layer 210b may be included upon an inner bottom surface of shield 120 and may extend from the inner right surface of shield 120 to the inner left surface of shield 120. The security trace 220' of 210b may be electrically connected to monitor device 130 by a wire 264 and connector 262 being connected to an adjacent security layer 210a via its connector 262.

FIG. 9 depicts various connection schemes to connect security trace 220' to monitor device 130 and, for clarity, a single particular connection scheme of the various schemes depicted may be utilized. For example, conductor on glass security layer 210a, 210b, and 210c may be included upon the inner surfaces of shield 120.

The security trace 220' of security layer 210a may be connected to monitor device 130 by connecting a connector 262 to daughter card connector 260, the security trace 220' of security layer 210b may be connected to monitor device 130 by connecting a connector 262 to security layer 210a, and the security trace 220' of security layer 210c may be connected to monitor device 130 by connecting a 262 to daughter card connector 266. Depending upon the connection scheme implemented, various conductive pathways within e.g. daughter PCB 122, PCB 102 and various connectors 129, 103 may electrically connect the monitor device 130 to conductor on glass security layer 210.

Figure 10:
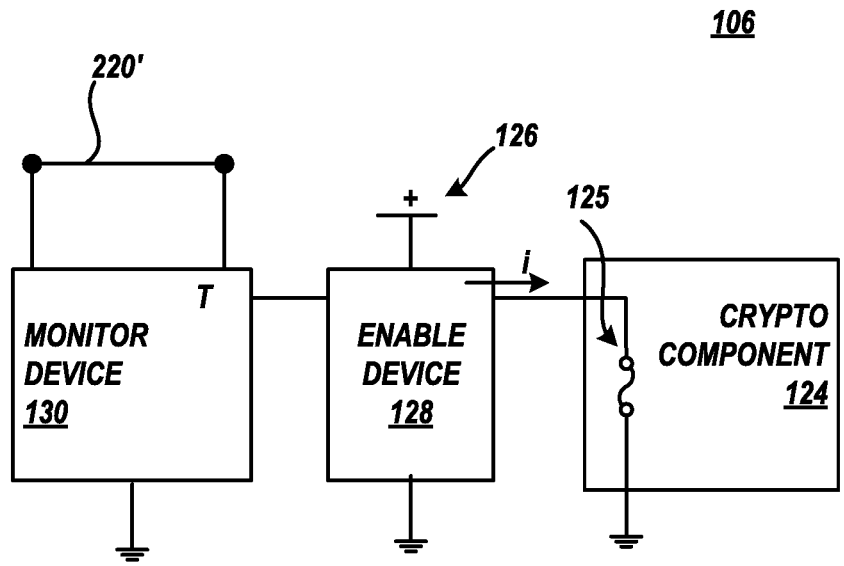
FIG. 10 illustrates a block circuit diagram of a secure crypto module that utilizes various embodiments of the present invention.

FIG. 10 illustrates an exemplary block circuit diagram of secure crypto module 106 that utilizes various embodiments of the present invention. Monitor device 130 is electrically connected to a first end of security trace 220' and electrically connected to a distal second end of security trace 220'. The security trace 220' may be located in a single or multiple wiring layers of PCB 102, 122, etc. or may be located upon a single or multiple inner surfaces of shield 120. Monitor device 130 continuously, periodically, etc. measures the resistance across the security trace 220' thereby monitoring the resistance of security trace 220'. Monitor device 130 may be a known resistance monitor such as a Whetstone bridge circuit, multimeter, etc. Monitor device 130 also generates and sends an enable signal to an intermediary device, such as enable device 128 or directly to crypto component 124 upon monitor device 130 measuring a predetermined resistance increase or open circuit across security trace 220'. For example, a default signal generated and sent from monitor device 130 to enable device 128 may be a low "0" signal. Upon the monitor device 130 detecting an open circuit across security trace 220' the enable signal is generated and sent from monitor device 130 to enable device 128 as a high "1" signal indicating that glass dielectric layer 212 has been shattered as a result of an unauthorized tamper event.

Enable device 128 has or is connected to electrical potential and connected to a destruct feature 125 within crypto component 124. The electrical potential may be the power supply of crypto adapter card PCB 122 or motherboard PCB 102 if the system is in operation. If the system is non-operational or the system power supply is unavailable, the electrical potential is battery 126. Upon receipt of the enable signal, enable device 128 directs current to destruct feature 125 thereby programming the destruct feature 125. In a particular embodiment, destruct feature 125 may be a fuse, one time programmable logic device, or the like. The programming of the destruct feature 125 results in zeroization of area(s) of the one or more crypto components 124 where sensitive data is stored, disables the crypto component 124, etc.

Figure 11:
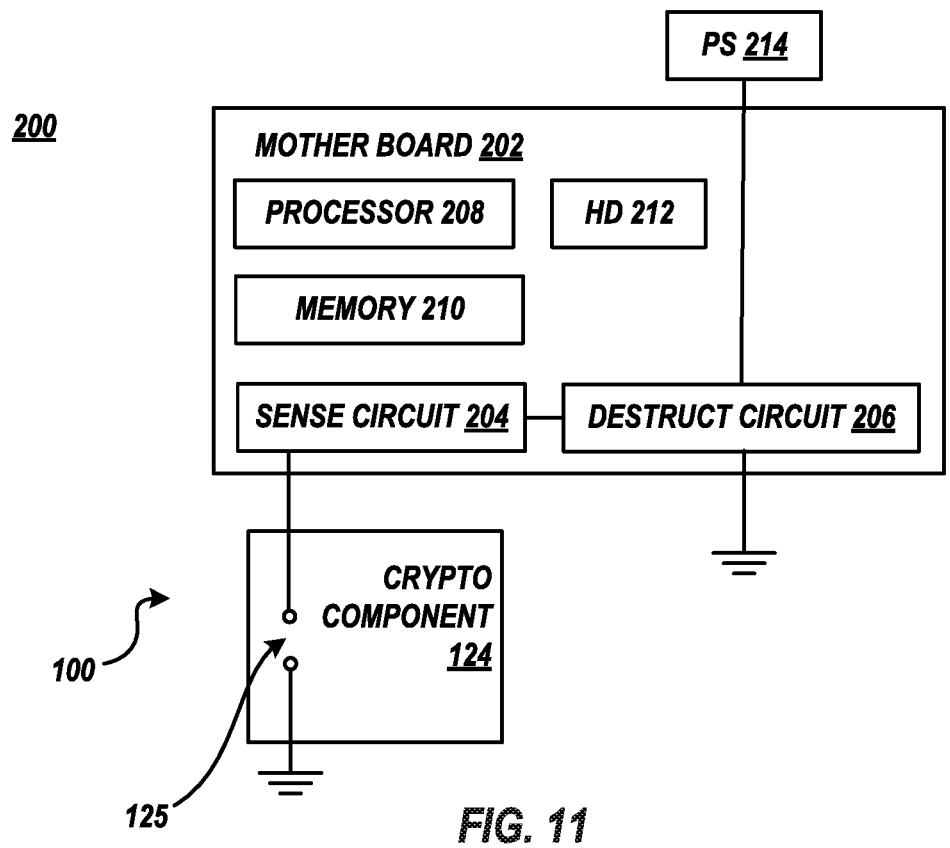
FIG. 11 illustrates of block diagram of a computer including a secure crypto module that utilizes various embodiments of the present invention.

FIG. 11 illustrates of block diagram of a computer 200 including a secure adapter card 100 that utilizes various embodiments of the present invention. In addition to computer devices such as memory 210, processor 208, etc., the computer motherboard 202 also includes a sense circuit 204 and a destruct circuit 206. The sense circuit 204 senses, monitors, or otherwise detects that destruct feature 125 has been programmed. Destruct circuit 206 is connected to a power supply 214, such as the power supply of computer 200. Upon sense circuit 204 determining destruct feature 125 has been programmed, destruct circuit 206 zeros area(s) of the computer 200 where sensitive data is stored (e.g., a hard drive 212, memory 210, etc.) and one or more functions of the computer 200 are permanently disabled. For example, the processor 208 or memory 210 may be disabled; an application program interface associated with crypto functions of secure crypto module 106 may be disabled, a data bus for communicating data between the processor and the crypto card 100 may be disabled, etc.

Figure 12:
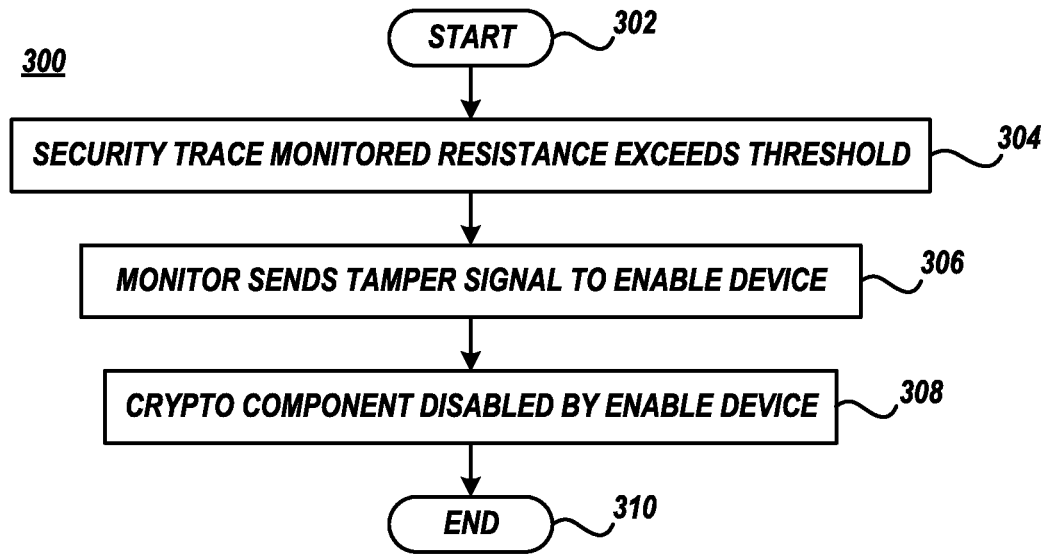
FIG. 12 and FIG. 13 illustrate exemplary methods of detecting and responding to an unauthorized attempt of physical access, according to various embodiments of the present invention.

FIG. 12 illustrates an exemplary method 300 of detecting and responding to an unauthorized attempt of physical access, according to various embodiments of the present invention. Method 300 may be utilized by a crypto adapter card 100 that includes a secure crypto module, a crypto component 124, a monitor device 130, and a conductor on glass security layer 210.

Method 300 begins at block 302 and continues by monitor device 130 detecting that the resistance across security trace 220' upon a glass dielectric 212 has exceeded a predetermined resistance threshold (block 304) which indicates that glass dielectric 212 has shattered as a result of an unauthorized physical access attempt thereupon. The shattering of the glass dielectric 212 results in the fracturing of security trace 220' which means the security trace 220' is severed resulting in an open circuit or is deformed which increases the resistance there across.

Method 300 may continue with the monitor device 130 sending a tamper signal to enable device 128 (block 306). For example, the monitor device 130 sends a high "1" tamper or enable signal to enable device 128 to generally instruct enable device 128 to program a destruct feature 125 within crypto component 124.

Method 300 may continue with crypto component 124 being disabled by the enable device 128 (block 308). For example, the programming of destruct feature 125 results in zeroization of area(s) of the one or more crypto components 124 where sensitive data is stored, renders the crypto component 124 inoperable, causes the crypto component 124 to perform spoof functions, causes the crypto component 124 to perform self-destruct functions, the activating of a tamper bit/byte within a crypto component 124 register, etc. Method 300 ends at block 310.

Figure 13:
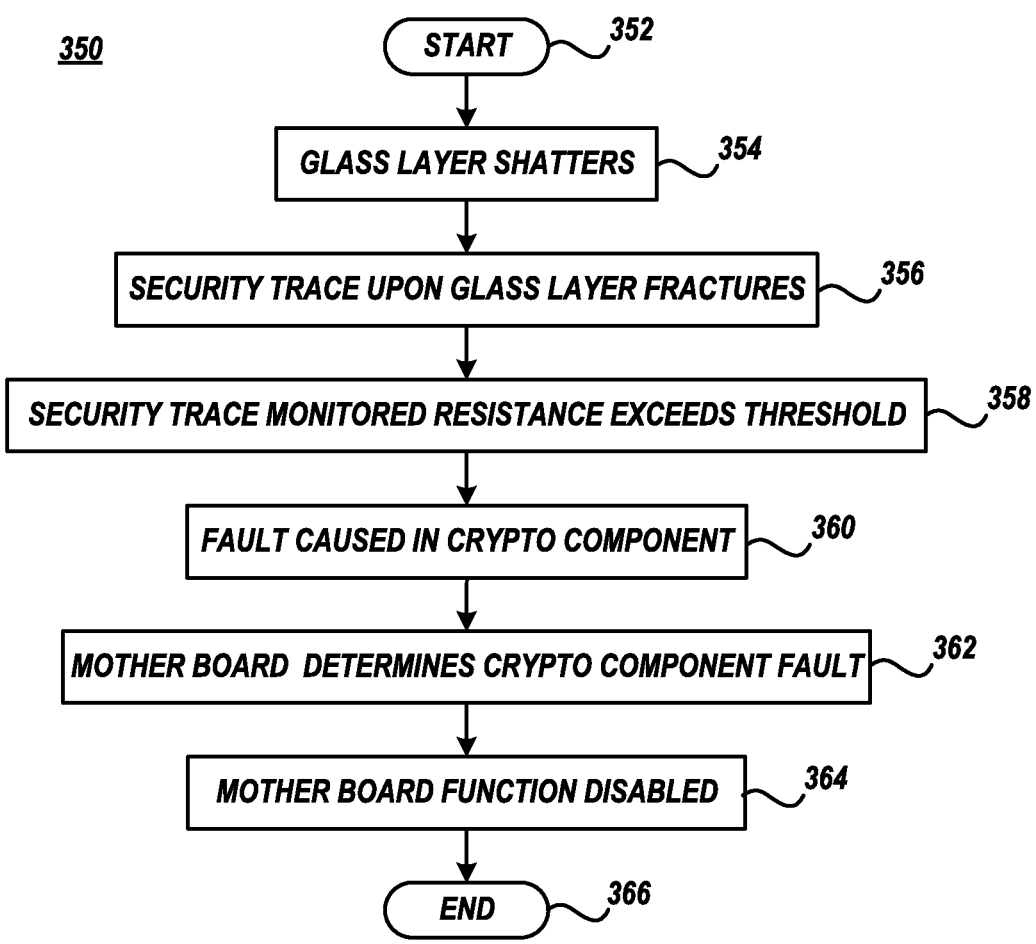

FIG. 13 illustrates an exemplary method 350 of detecting and responding to an unauthorized attempt of physical access, according to various embodiments of the present invention. Method 350 may be utilized by a computer 200 that includes a motherboard 202 that includes a sense circuit 204, and a destruct circuit, and a crypto adapter card 100 connected thereto. The crypto adapter card 100 includes a secure crypto module 106, a crypto component 124, a monitor device 130, and a conductor on glass security layer 210.

Method 350 begins at block 352 and continues with glass dielectric 212 shattering as a result of an unauthorized physical access attempt thereupon (block 354). For example, at least the majority of the glass dielectric layer 212 within conductor on glass security layer 210 shatters when a point load intrudes into the glass dielectric layer 212 by 0.004 inches or a hole of 0.004 inches in diameter intrudes into the glass dielectric layer 212.

Method 350 may continue with security trace 220' that is located upon the glass dielectric layer 212 fracturing (block 356). Fracturing means that the security trace 220' may be completely severed or deformed. If the security trace 220' is severed it is separated into at least two portions across the length of security trace 220'. Such severing of the security trace 220' results in a security trace 220' open circuit. If the security trace 220' is deformed, the security trace 220' cross sectional area is reduced at one or more section 250 junctions. In other words, the security trace 220' may be pinched in one or more locations across the length of security trace 220'. The deformity of security trace 220' generally increases the resistance across the security trace 220'.

Method 350 may continue with monitor device 130 detecting that the resistance across security trace 220' has exceeded a predetermined resistance threshold (block 358) which indicates that glass dielectric 212 has shattered as a result of an unauthorized physical access attempt thereupon. The shattering of the glass dielectric 212 results in the fracturing of security trace 220' which means the security trace 220' is severed resulting in an open circuit or is deformed which increases the resistance there across.

Method 350 may continue with causing a fault in crypto component 124 (block 360). The fault is generally the result of the programming of destruct feature 125 within crypto component 124. For example, the fault of crypto component 124 may result in zeroization of area(s) of the one or more crypto components 124 where sensitive data is stored, renders the crypto component 124 inoperable, causes the crypto component 124 to perform spoof functions, causes the crypto component 124 to perform self-destruct functions, the activating of a tamper bit/byte within a crypto component 124 register, etc.

Method 350 may continue with motherboard 202 determining that the crypto component 124 has faulted (block 362). The motherboard 202 sense circuit 204 determines, monitors, or otherwise detects that destruct feature 125 has been programmed causing the fault of crypto component 124.

Method 350 may continue with disabling functionality provided by motherboard 202 (block 364). The disabling of functionality is generally the result of detecting the programming of destruct feature 125 within crypto component 124. For example, the fault of crypto component 124 may result in zeroization of area(s) of memory 210, processor 208, hard drive 212, etc. where sensitive data is stored, renders the memory 210, processor 208, etc. inoperable, causes the memory 210, processor 208, etc. to perform spoof functions, causes the memory 210, processor 208, etc. to perform self-destruct functions, etc. Method 350 ends at block 366.

Figure 14:
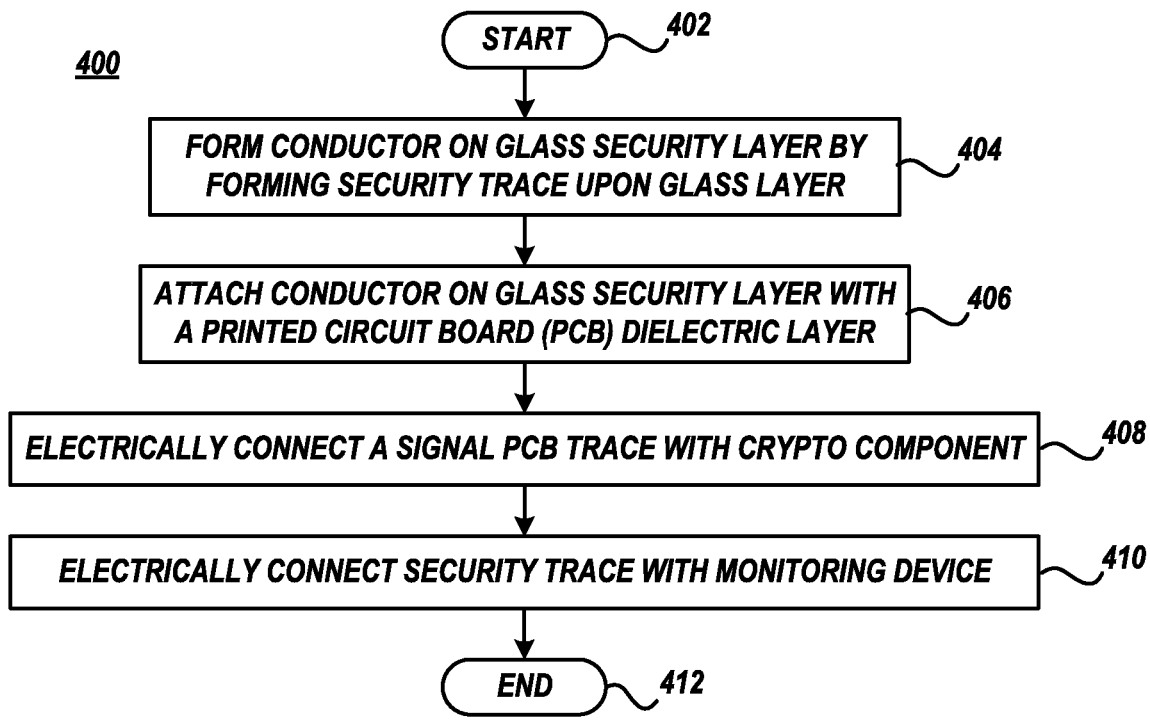
FIG. 14 illustrates an exemplary method of fabricating a cryptographic PCB, according to various embodiments of the present invention.

FIG. 14 illustrates an exemplary method 400 of fabricating a circuit board including conductor on glass security layer 210, such as daughter PCB 122, or a structure circuit board including conductor on glass security layer 210, such as a crypto adapter card 100, according to various embodiments of the present invention. Method 400 may be utilized to fabricate adapter PCB 102 and/or daughter PCB 122 with a conductor on glass security layer 210.

Method 400 begins at block 402 and continues with forming a conductor on glass security layer 210 by forming a security trace 220' upon a glass substrate 212 (block 404). For example, the security trace 220' may be formed by additive fabrication techniques where security trace 220' is applied directly to glass substrate 212. In other examples, the security trace 220' may be formed by subtractive fabrication techniques where a security trace layer 220 is bonded to glass substrate 212 by a bonding layer 216 and where, subsequently, portions of the security trace layer 220 and bonding layer 216 are removed from the glass substrate 212 to form the security trace 220'.

Method 400 may continue with attaching the formed conductor on glass security layer 210 to a PCB dielectric layer 230 (block 406). For example, the dielectric layer 230 may be laminated to the security trace 220' and to the glass substrate 212. Alternatively, the dielectric layer 230 may be laminated to the glass substrate 212 side opposite the glass substrate 212. The dielectric layer 230 is generally associated with a PCB wiring stack 240 which includes one or more wiring layers of interleaved dielectric layer 230 and trace layer 218. Further, there is at least one conductive trace within the trace layer 218 that is utilized to communicate electrical signals to or from devices upon or within the PCB.

Method 400 may continue with electrically connecting a signal trace to crypto component 124 to communicate electrical signals to or from crypto component 124 (block 408). For example, multiple signal traces may be electrically connected to crypto component 124. The signal traces in a particular PCB trace layer 218 may be electrically connected to signal traces in a different PCB trace layer 218 within PCB wiring stack 240. If the PCB that which includes glass security layer 210 is PCB 122, the crypto component 124 may be electrically connected to a trace via a surface mount contact, pad, pin-in-hole contact, plated-through hole, etc. If the PCB that which includes glass security layer 210 is PCB 102, the crypto component 124 may be electrically connected to the signal trace via daughter card 122, connectors 103, 129.

Method 400 may continue with electrically connecting the security trace 220' with monitoring device 130 (block 410). If the PCB that which includes glass security layer 210 is PCB 122, the monitoring device 130 may be electrically connected the security trace 220' via a surface mount contact, pad, pin-in-hole contact, plated-through hole, etc. If the PCB that which includes glass security layer 210 is PCB 102, the monitoring device 130 may be electrically connected to the security trace 220' via daughter card 122, connectors 103, 129. Method 400 ends at block 412.

Figure 15:
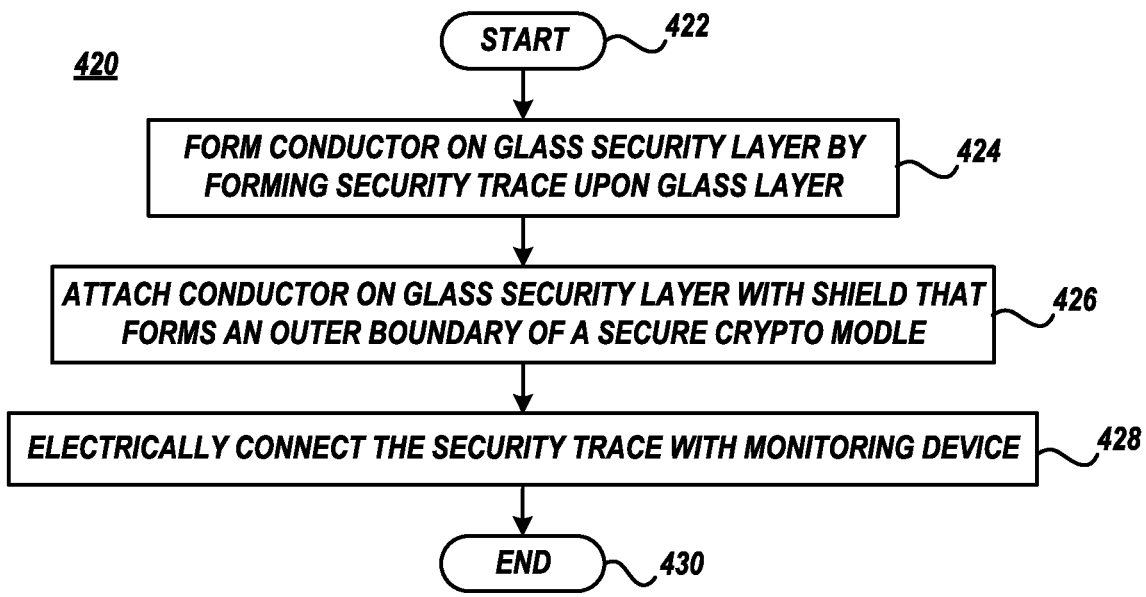
FIG. 15 illustrates an exemplary method of fabricating a crypto adapter card including a secure crypto module, according to various embodiments of the present invention.

FIG. 15 illustrates an exemplary method 420 of fabricating a crypto adapter card 100 including a secure crypto module 106, according to various embodiments of the present invention. Method 420 may be utilized to form a conductor on glass security layer 210 upon one or more inner surfaces of shield 120 of secure crypto module 106.

Method 420 begins at block 422 and continues with forming a security trace 220' upon a glass substrate 212 (block 424). The security trace 220' may be formed by additive fabrication techniques where security trace 220' is applied directly to glass substrate 212. Alternatively, the security trace 220' may be formed by subtractive fabrication techniques where a security trace layer 220 is bonded to glass substrate 212 by a bonding layer 216 and where, subsequently, portions of the security trace layer 220 and bonding layer 216 are removed from the glass substrate 212 to form the security trace 220'.

Method 420 may continue with attaching the glass substrate 212 to one or more inner surfaces of shield 120 that forms an outer boundary of the secure crypto module 106 (block 426). For example, a bonding layer 216a may be formed upon the side of glass substrate 212 opposite the security trace 220'. The bonding layer 216a may be used connect the conductor on glass security layer 210 upon one or more inner surfaces of shield 120 of secure crypto module 106.

Method 420 may continue with electrically connecting the security trace 220' with monitor device 130 (block 428). For example, a wire 264 electrically connected to terminal ends of security trace 220' is attached to a connector 264 that may be electrically connected to daughter PCB 122. One or more signal traces within daughter PCB 122 then electrically connect the connector 264 to monitor device 130. Method 420 ends at block 430.

Embodiments of the present invention may be a system, a method, and/or a computer program product. The computer program product may include a computer readable storage medium (or media) having computer readable program instructions thereon for causing a processor to carry out aspects of the present invention. The computer readable storage medium is a tangible device that can retain and store instructions for use by an instruction execution device. The computer readable storage medium may be, for example, but is not limited to, an electronic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. An adapter card comprising:
a printed circuit board (PCB) comprising a connector that interconnects with a motherboard, the PCB comprising a PCB conductor on glass security layer comprising a first security trace directly upon a first toughened glass substrate;
a secure crypto module comprising a daughter card electrically connected to the PCB, a shield comprising a metal shell that surrounds the daughter card, and a shield conductor on glass security layer directly upon an inner surface of the metal shell that faces the daughter card, the shield conductor on glass security layer comprising a second security trace directly upon a second toughened glass substrate;
the daughter card comprising: one or more wiring layers each comprising a signal trace directly upon a dielectric layer, a crypto component, and a daughter card conductor on glass security layer comprising a third security trace directly upon a third toughened glass substrate; and
a resistance monitor device, imbedded within the PCB, electrically connected to the first security trace, the second security trace, and the third security trace, wherein a destruct feature of the crypto component is programmed in response to the resistance monitor device detecting the resistance across the first security trace, the second security trace, or the third security trace exceeds a respective predetermined threshold.

2. The adapter card of claim 1, wherein the first toughened glass substrate, the second toughened glass substrate, and the third toughened glass substrate each respectively comprise an inner portion that is in tension and is in between outer surfaces that are in compression.

3. The adapter card of claim 1, wherein the daughter card conductor on glass security layer is an outer layer of the daughter card and is attached directly to the one or more wiring layers.

4. The adapter card of claim 1, wherein the daughter card conductor on glass security layer is an inner layer of the daughter card and is attached directly to the one or more wiring layers.

5. The adapter card of claim 1, wherein the daughter card further comprises an enable device that upon receipt of a tamper signal from the monitor device programs the destruct feature.

6. The adapter card of claim 1, wherein the detected resistance across the first security trace, the second security trace, or the third security trace is an infinite resistance.

7. The adapter card of claim 1, wherein the first security trace, the second security traces, or the third security trace is fractured as a result of an unauthorized physical access of the first toughened glass substrate, the second toughened glass substrate, or the third toughened glass substrate, respectively.

8. The adapter card of claim 1, wherein the first security trace, the second security trace, or the third security trace is severed as a result of an unauthorized physical access of the first toughened glass substrate, the one or more second toughened glass substrates, or the third toughened glass substrate, respectively.

9. A data handling electronic device comprising:
a motherboard comprising a processor and a memory;
a printed circuit board (PCB) comprising a connector that interconnects with the motherboard, the PCB comprising a PCB conductor on glass security layer comprising a first security trace directly upon a first toughened glass substrate;
a secure crypto module comprising a daughter card electrically connected to the PCB, a shield comprising a metal shell that surrounds the daughter card, and a shield conductor on glass security layer directly upon an inner surface of the metal shell that faces the daughter card, the shield conductor on glass security layer comprising a second security trace directly upon a second toughened glass substrate;
the daughter card comprising: one or more wiring layers each comprising a signal trace directly upon a dielectric layer, a crypto component, and a daughter card conductor on glass security layer comprising a third security trace directly upon a third toughened glass substrate; and
a resistance monitor device, imbedded within the PCB, electrically connected to the first security trace, the second security trace, and the third security trace, wherein a destruct feature of the crypto component is programmed in response to the resistance monitor device detecting the resistance across the first security trace, the second security trace, or the third security trace exceeds a respective predetermined threshold.

10. The data handling electronic device of claim 9, wherein the first toughened glass substrate, the second toughened glass substrate, and the third toughened glass substrate each respectively comprise an inner portion that is in tension and is in between outer surfaces that are in compression.

11. The data handling electronic device of claim 9, wherein the daughter card conductor on glass security layer is an outer layer of the daughter card and is attached directly to the one or more wiring layers.

12. The data handling electronic device of claim 9, wherein the daughter card conductor on glass security layer is an inner layer of the daughter card and is attached directly to the one or more wiring layers.

13. The data handling electronic device of claim 9, wherein the daughter card further comprises an enable device that upon receipt of a tamper signal from the monitor device programs the destruct feature.

14. The data handling electronic device of claim 9, wherein the detected resistance across the first security trace, the second security trace, and the third security trace is an infinite resistance.

15. The data handling electronic device of claim 9, wherein the first security trace, the second security trace, or the third security trace is fractured as a result of an unauthorized physical access of the first toughened glass substrate, the one or more second toughened glass substrates, or the third toughened glass substrate, respectively.

16. The data handling electronic device of claim 9, wherein the first security trace, the second security trace, or the third security trace is severed as a result of an unauthorized physical access of the first toughened glass substrate, the one or more second toughened glass substrates, or the third toughened glass substrate, respectively.

* * * * *